J. McILWAIN.
NUT LOCK.
APPLICATION FILED FEB. 13, 1909.

938,503.

Patented Nov. 2, 1909.

WITNESSES

INVENTOR
James McIlwain
BY Munn & Co.
ATTORNEYS

UNITED STATES PATENT OFFICE.

JAMES McILWAIN, OF OKAWVILLE, ILLINOIS.

NUT-LOCK.

938,503.  Specification of Letters Patent. Patented Nov. 2, 1909.

Application filed February 13, 1909. Serial No. 477,536.

*To all whom it may concern:*

Be it known that I, JAMES MCILWAIN, a citizen of the United States, and a resident of Okawville, in the county of Washington and State of Illinois, have invented a new and Improved Nut-Lock, of which the following is a full, clear, and exact description.

This invention relates to certain improvements in nut locks, and more particularly to that type of nut lock in which a retainer of wire or the like engages within grooves, openings or apertures in the nut, to prevent the latter from turning.

The invention consists in the features of construction hereinafter described and particularly pointed out in the claims.

Reference is to be had to the accompanying drawings, forming a part of this specification, in which similar characters of reference indicate corresponding parts in all the figures, and in which—

Figure 1:
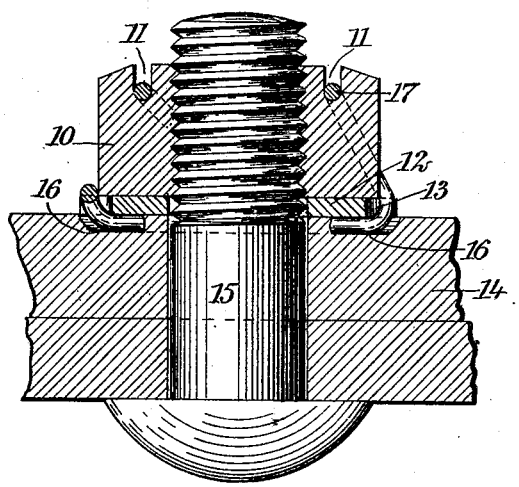
Figure 2:
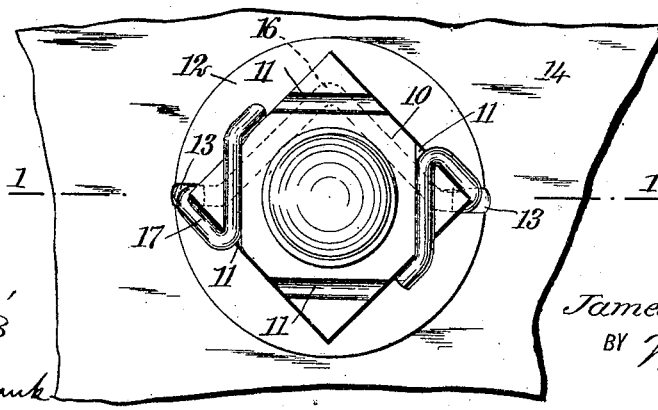

Figure 1 is a longitudinal section through a device constructed in accordance with my invention, said section being taken on the line 1—1 of Fig. 2; and Fig. 2 is a top plan view of the construction shown in Fig. 1.

In my improved form of nut lock, I provide the nut with a plurality of grooves cut or pressed into one face thereof and extending from one side edge to another. In the constructions shown I employ a nut 10 having four grooves 11 cut in one face thereof, each groove extending diagonally across a corresponding corner of the nut. The grooves are each preferably of a depth somewhat greater than its width, but it is evident that the relative proportions of the grooves may be varied if desired.

If a single nut is to be locked in position, I preferably employ in connection therewith a washer 12 formed from a flat plate and preferably of a slightly greater diameter than the nut. At diametrically opposite points the washer is provided with apertures 13 of a width substantially equal to the width of the grooves in the nut. Beneath the washer the plate, member, body or other part 14, through which a bolt 15 may extend, is provided with a substantially V-shaped groove 16 in one surface. This groove is of a depth substantially equal to the width of the groove in the nut and terminates at diametrically opposite sides of the opening through which the bolt extends. When the washer 12 is placed in engagement with the surface of the member, the two recesses 13, 13 in the edges of the washer come adjacent the end of the V-shaped groove 16, so that a channel or passage is formed beneath the washer and terminates at diametrically opposite points thereof. Into this groove I place a wire 17 which may be of any suitable form in cross section, and which constitutes the retainer. The wire if used for holding in position a single nut, is preferably of a length approximately equal to three and one-half times the width of the nut to be locked, although it may be longer or shorter, if desired. The center portion of the wire is bent to lie in the V-shaped groove 16, and the washer is then placed over the wire, so that the ends of the latter extend upwardly through the recesses 13 in the washer. The nut is then secured in place and the ends of the wire are bent upwardly along the sides of the nut, thence transversely through two of the grooves in the outer surface of the nut. The ends of the wire may be bent down into engagement with the sides of the nut to protect them against displacement. If the member 14 be of soft wood, it is evident that no groove 16 need be provided, but that the screwing of the nut in place will force the retainer into the wood to form the groove. In certain forms, the washer 12 may be omitted, if desired.

Having thus described my invention, I claim as new and desire to secure by Letters Patent:

1. In a nut lock, the combination of a member having an aperture therethrough and a substantially V-shaped groove in its surface near the aperture and terminating at diametrically opposite points in respect to said aperture, a washer in engagement with the surface of said member and having recesses in its opposite edges and adjacent the ends of said groove, a nut in engagement with said washer and having grooves in its outer surface, and a wire retainer disposed within the V-shaped groove in said member and extending through said recesses in the washer and through the grooves in said nut.

2. In a nut lock, the combination of a member having an aperture therethrough and a substantially V-shaped groove in its surface near the aperture and terminating at diametrically-opposite points in respect to said aperture, a bolt extending through said aperture, a washer in engagement with the surface of said member, a nut in engagement with said washer and having grooves in its outer surface, and a wire retainer disposed within said V-shaped groove in said member and through the grooves in said nut.

In testimony whereof I have signed my name to this specification in the presence of two subscribing witnesses.

JAMES McILWAIN.

Witnesses:
WALTER AUGUST MOEHLE,
WILLIAM HENRY KUGLER.